United States Patent

[11] 3,562,443

[72] Inventors Jules Bos; Jacob Koorneef; George Ludwig Walther, Emmasingel, Eindhoven, Netherlands

[21] Appl. No. 667,713
[22] Filed Sept. 14, 1967
[45] Patented Feb. 9, 1971
[73] Assignee U.S. Philips Corporation New York, N.Y. a corporation of Delaware. by mesne assignments
[32] Priority Sept. 15, 1966
[33] Netherlands
[31] 6613008

[54] COMPOSITE RECORDING/PLAYBACK HEAD WITH TWO TRIM ERASE HEADS ORIENTED AT AN ANGLE TO THE RECORD/PLAYBACK HEAD
6 Claims, 6 Drawing Figs.

[52] U.S. Cl. .......... 179/100.2
[51] Int. Cl. .......... G11b 5/26, G11b 5/28
[50] Field of Search .......... 179/100.2C, 100.2D; 340/174.1F; 346/74MC

[56] References Cited

UNITED STATES PATENTS

| | | | |
|---|---|---|---|
| 3,132,214 | 5/1964 | Welsh | 179/100.2 |
| 3,155,949 | 11/1964 | Tibbets | 179/100.2 |
| 2,653,189 | 9/1953 | Camras | 179/100.2 |

OTHER REFERENCES

Dawson, " Side Erase Magnetic Head," IBM Tech Disclosure, Vol. 8, No. 2, July 1965, P220

Hopkins, " Tunnel Erase Magnetic Transducer," IBM Tech Disclosure, Vol. 8, No. 4, Sept. 1965, P. 603

Mc Clung, " Intergral Transverse Margin Erase," IBM Tech Disclosure, Vol. 8 No. 8, Jan. 1966, P. 1044

Mc Whinney, " Concurrent Write-Tunnel Erase," IBM Tech. Disclosure, Vol. 9, No. 7, Dec. 1966, p. 775

*Primary Examiner*—Bernard Konick
*Assistant Examiner*—Robert S. Tupper
*Attorney*—Frank R. Trifari

ABSTRACT: A composite magnetic recording and/or playback head having an effective gap and two erasing gaps located on either side of the effective gap, the erasing gaps each occupying an angle of between 0 and 90° with the direction of the track covered by the effective gap.

Figure 1:
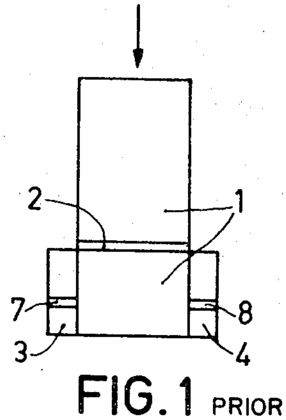
FIG. 1 PRIOR ART

JULES BOS
JACOB KOORNEEFF
GEORGE L. WALTHER
INVENTORS
BY
Frank R. Jirofani
AGENT

COMPOSITE RECORDING/PLAYBACK HEAD WITH TWO TRIM ERASE HEADS ORIENTED AT AN ANGLE TO THE RECORD/PLAYBACK HEAD

The invention relates to a composite magnet recording and/or playback head. The head includes a front face having an effective gap, and two erasing heads the effective gaps of which cover tracks which limit the track recorded or to be recorded by the recording/playback gap.

Such composite magnetic recording and/or playback heads are known and serve to prevent interfering signals in playing back records on a record carrier (for example on a drum, disc or tape) as a result of lateral positioning errors. These interfering signals may occur when a playback gap is not accurately positioned on the track to be played back and a strip situated beside that track is also played back. This strip may comprise, for example, information which in recording the track to be played back was not erased and consequently originates from a recording process which took place previously.

In order to diminish the occurrence of said interfering signals as a result of possible positioning errors of a magnetic recording and/or playback head on a given track of a record carrier, an erasing head is arranged on either side of the recording/playback head. These erasing heads cover respective tracks, one of which limits the main track on the left-hand side and the other of which limits the main track on the right-hand side. During the recording process all the three heads are energized so that an erased strip is formed on either side of the recorded track. If required the erased strips may also be provided after recording. The choice of the width of the erasing tracks depends upon the accuracy with which by means of a positioning mechanism the head can be adjusted at a given track.

An obvious and commonly used construction of a composite magnetic recording and/or playback head comprising a recording/playback head flanked by erasing heads is that in which the effective gaps of the erasing heads extend at right angles to the direction of movement of the record carrier. Since this is also the direction in which the recording/playback gap preferably extends, the three gaps will generally extend in parallel. This construction, however, has the drawback that a magnetic field produced in the effective gap of an erasing head influences the magnetic field in the effective gap of the recording/playback head while in addition the erasing gaps in this position are just suitable for playing back signals recorded by the recording gap. Since the erasing heads and the recording/playback head are separated magnetically from one another only by means of a very thin layer of a nonmagnetizable cement and the magnetic fields are directed the same in both heads, such an undesired influencing is unavoidable. In addition the manufacture of erasing heads as described above presents structural difficulties. In order to minimize the loss of effective recording surface area, the erasing tracks may not be wider than is necessary in connection with the maximally possible positioning error.

An embodiment which does not exhibit the above-mentioned drawbacks is known, for example, from IBM-Technical-Disclosure Bulletin, Vol. 8, Nr. 2, Jul. 1965. The composite magnetic recording and/or playback head described in said bulletin also comprises an erasing head on either side of the recording/playback head but in contrast with the above-described construction the erasing gaps in said head extend parallel to the direction of movement of the record carrier and at right angles to the recording/playback gap. The fields in the main gap and in the erasing gaps are no longer in the same direction so that the sensitivity of the erasing heads for recorded signals and the influencing of the recording/playback circuit by the field of the erasing heads are at a minimum. (It is assumed in this case that the recording/playback circuit is not magnetically saturated). Moreover, in this latter construction robuster circuit components may be chosen for the erasing head so that the construction of such a head is facilitated.

In particular, however, when the track to be played back has a small width, for example, 100 microns this latter construction of a composite magnetic recording and/or playback head comprising a recording/playback head flanked by erasing heads involve a considerable drawback. In fact, beside an erased track there always is a transition region. This region extends from the outer edge of the main track over a distance of at least the width of the adjacent erasing gap in the main track. In such a transition region in the recorded main track the magnetization gradually decreases towards the edge. Since a main track comprises two such transition regions, the relative intensity of the resulting signal may be very adversely influenced. In comparatively narrow tracks, that is to say tracks having a width in the same order of magnitude as the width of the erasing tracks, and consequently of the maximally occurring positioning errors, said constructions will even be entirely useless.

The invention is based on the recognition of the fact that it is possible in the case of a given maximum occurring positioning error to use such narrow erasing gaps in a composite magnetic recording and/or playback a head of the above-described known type that the width of a transition region is negligible small relative to the width of the main track while nevertheless the width of the erasing tracks is adapted to the maximum positioning error.

A composite magnetic recording and/or playback head according to the invention is characterized in that the gaps of the erasing head enclose an angle between 0 and 90° with the direction of the track which is covered by the recording/playback head.

The value of the angle, so the extent of inclination, determines the width of the erased track.

By using narrow erasing gaps in the above-described manner an erasing current will be sufficient which is smaller than in the known constructions and the above-mentioned transition region in the main track will be considerably less than is the case in the conventional constructions having erasing gaps at right angles.

The invention may be embodied in various constructions of composite heads each having their specific advantages. For example, it may be of advantage if, according to an embodiment of the invention, the gaps of the erasing heads are located so that they cover tracks which are situated outside the track which is covered by the recording/playback gap. An advantage of this construction is that the noise as a result of the erasing tracks tracks will be at a minimum; a drawback, however, is that the intensity of the signal is sensitive to any positioning errors occurring.

Another embodiment of the invention is characterized in that the gaps of the erasing heads cover tracks which are located inside the track which is covered by the recording/playback gap. The drawback of this construction is that the noise as a result of the erased tracks which are also played back is at a maximum but intensity of the played-back signal is independent of errors in the positioning as long as these do not exceed the width of the erasing track.

According to still another embodiment the erasing heads may cover tracks which are partly located inside the track which is covered by the recording/playback gap and partly outside said track.

The erasing heads may also be arranged relative to the recording/playback gap in such manner that viewed in the direction of movement of the record carrier relative to the recording/playback gap, the gap of one erasing head is located in front of said recording/playback gap, that of the other erasing head is located behind said recording/playback gap, while the two erasing gaps extend in parallel. This embodiment has structural advantages: it is simpler to ensure that they all accurately enclose a given angle with the relative direction of movement of the record carrier.

Figure 2:
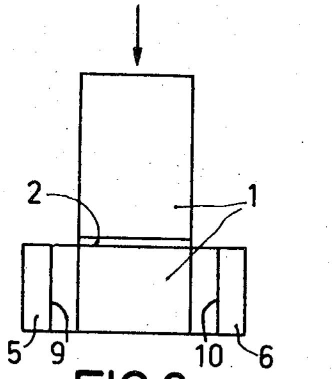
FIG. 2 PRIOR ART

In order that the invention may readily be carried into effect it will now be described in greater detail, by way of example, with reference to the accompanying drawing in which each time a diagrammatic plan view is shown of:

FIG. 1: a composite magnetic recording and/or playback head in which the erasing gaps extend parallel to the recording/playback gap;

FIG. 2: a composite magnetic recording and/or playback head in which the erasing gaps extend at right angles to the recording/playback gap;

FIGS. 3, 4, 5 and 6: composite magnetic recording and/or playback heads the erasing gaps of which enclose angles between 0 and 90° with the recording/playback gap.

Reference numeral 1 denotes the magnetic circuit of the recording/playback head comprising the effective gap 2. The arrows denote a directional axis defining the direction of movement of the record carrier relative to the head. In FIGS. 1 and 2 the recording/playback head is each time flanked by two erasing heads 3, 4 and 5, 6, respectively. In FIG. 1 the gaps 7, 8 of the erasing heads 3, 4 extend parallel to the recording/playback gap 2; in FIG. 2 they extend at right angles thereto. In both cases, however, during erasing not only a strip on either side of the main track will be erased but also the outer edges of the main track will experience the influence of the erasing fields. Accordingly, as the main track is narrower said influence will be stronger.

Figure 3:
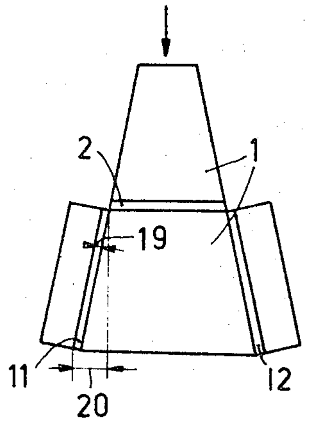

In FIGS. 3, 4, 5 and 6 the erasing gaps 11—18 enclose acute angles of between 0 and 90° with the recording/playback gap 2. This means that, as shown in FIG. 3, with a width 19 of the erasing gap 11 nevertheless an erasing track with a width 20 can be obtained. Because the erasing gap 11 is so much narrower than the erasing gaps 7, 8 and 9, 10 in FIGS. 1 and 2, respectively, the influence of the erasing fields on the main track is considerably smaller.

Figure 4:
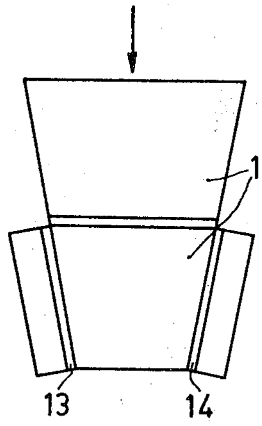
Figure 5:
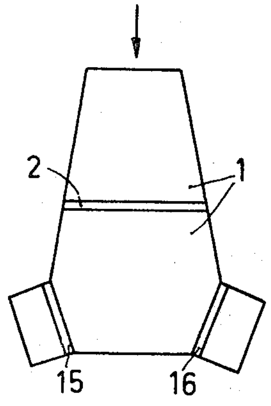
Figure 6:
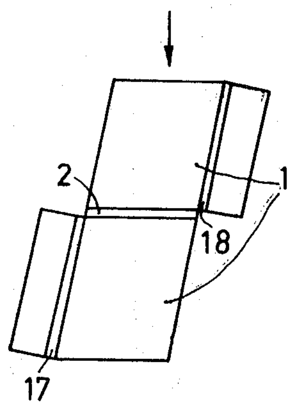

FIGS. 4, 5 and 6 shown examples in which the erasing gaps always enclose an angle with the recording/playback gap in which, however, each construction has particular additional advantages and drawbacks.

The embodiment shown in FIG. 4, for example, comprises erasing gaps which erase part of the main track; in playing back the gap 2 will always play back also the tracks erased by 13 and 14. This means that an additional noise will occur. An advantage, however, is that a track, once it is written, can always be played back entirely without part of the total signal being lost as a result of positioning errors.

The embodiment shown in FIG. 3 is, as it were, the counterpart of that shown in FIG. 4: in this case the noise will be minimum but as a result of errors in (re)positioning part of the recorded signal will be lost.

By choosing a configuration as shown in FIG. 5 the properties of that shown in FIGS. 3 and 4 are combined.

As regards loss of signal in repositioning and as regards occurring noise, the embodiment shown in FIG. 6 resembles that shown in FIG. 3. An advantage is, however, that it is structurally much simpler to provide the erasing gaps 17 and 18 in such manner that they extend mutually parallel than to cause them to assume accurately a given previously determined position relative to the recording/playback gap 2 as shown in FIGS. 3, 4 and 5.

We claim:

1. a composite magnetic head comprising an effective gap for recording and/or playing back with respect to a track on a record carrier having movement relative to said head, and first and second erasing gaps positioned on opposite sides of said effective gap to limit said track, each of said erasing gaps enclosing an angle of more than 0 ° but less than 90° with respect to the direction of said relative movement.

2. The combination of claim 1 wherein said erasing gaps each define a track outside of the track covered by said effective gap.

3. The combination of claim 1 wherein said erasing gaps each define a track within the track covered by said effective gap.

4. The combination of claim 1 wherein said erasing gaps each define a track partially within and partially without the track covered by said effective gap.

5. A composite magnetic recording and/or playback head comprising an effective gap for recording and/or playing back with respect to a track on a record carrier having movement relative to said head, said movement defining a directional axis with respect to said head, and first and second erasing gaps positioned on opposite sides of said effective gap, each of said erasing gaps enclosing an acute angle with respect to said directional axis.

6. A composite magnetic head comprising an effective gap for recording and/or playing back with respect to a track on a record carrier having movement relative to said head, and first and second erasing gaps positioned on opposite sides of said effective gap to limit said track, said erasing gaps each defining a track outside of the track covered by said effective gap, said erasing gaps located respectively before and after said effective gap in the direction of movement of said record carrier relative to said head, said erasing gaps extending in mutually parallel directions, each of said erasing gaps enclosing an angle of more than 0 but less than 90° with respect to the direction of said relative movement.